(12) United States Patent
Kawai et al.

(10) Patent No.: US 11,929,467 B2
(45) Date of Patent: Mar. 12, 2024

(54) SECONDARY BATTERY

(71) Applicant: Murata Manufacturing Co., Ltd., Nagaokakyo (JP)

(72) Inventors: Toru Kawai, Nagaokakyo (JP); Masahiro Otsuka, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 284 days.

(21) Appl. No.: 16/411,331

(22) Filed: May 14, 2019

(65) Prior Publication Data

US 2019/0267579 A1 Aug. 29, 2019

Related U.S. Application Data

(63) Continuation of application No. PCT/JP2017/039452, filed on Oct. 31, 2017.

(30) Foreign Application Priority Data

Dec. 6, 2016 (JP) .................... 2016-237025

(51) Int. Cl.
*H01M 10/42* (2006.01)
*H01M 10/04* (2006.01)
(Continued)

(52) U.S. Cl.
CPC ......... *H01M 10/425* (2013.01); *H01M 10/04* (2013.01); *H01M 10/058* (2013.01);
(Continued)

(58) Field of Classification Search
CPC .... H01M 50/10; H01M 50/543; H01M 10/04; H01M 10/058; H01M 10/0587;
(Continued)

(56) References Cited

U.S. PATENT DOCUMENTS 7,862,919 B2 * 1/2011 Kim ................... H01M 50/209
429/162
8,945,744 B2 2/2015 Kwon et al.
(Continued)

FOREIGN PATENT DOCUMENTS

CN 104241578 A 12/2014
CN 105990597 A 10/2016
(Continued)

OTHER PUBLICATIONS

International Search Report issued in PCT/JP2017/039452, dated Dec. 12, 2017.
(Continued)

*Primary Examiner* — Amanda C. Walke
(74) *Attorney, Agent, or Firm* — ArentFox Schiff LLP

(57) ABSTRACT

A secondary battery including an electrode assembly having a positive electrode, a negative electrode, and a separator arranged between the positive electrode and the negative electrode, an electrolyte, and an exterior body housing the electrode assembly and the electrolyte. The exterior body has at least two step portions adjacent to each other and having top surfaces with different heights, the at least two step portions including a low step portion and a high step portion. A stepped surface is formed between the top surface of the low step portion and the top surface of the high step portion, and at least part of a board is arrangeable on the top surface of the low step portion.

20 Claims, 10 Drawing Sheets

(51) Int. Cl.
- *H01M 10/058* (2010.01)
- *H01M 10/0585* (2010.01)
- *H01M 10/0587* (2010.01)
- *H01M 50/103* (2021.01)
- *H01M 50/54* (2021.01)
- *H01M 50/55* (2021.01)
- *H01M 50/553* (2021.01)

(52) U.S. Cl.
CPC ... *H01M 10/0585* (2013.01); *H01M 10/0587* (2013.01); *H01M 50/103* (2021.01); *H01M 50/54* (2021.01); *H01M 50/55* (2021.01); *H01M 50/553* (2021.01); *H01M 2010/4271* (2013.01); *H01M 2220/30* (2013.01)

(58) Field of Classification Search
CPC ........... H01M 10/0585; H01M 10/425; H01M 2010/4271; H01M 2220/30

See application file for complete search history.

(56) References Cited

U.S. PATENT DOCUMENTS

| | | | |
|---|---|---|---|
| 9,257,728 B2 | 2/2016 | Adachi et al. | |
| 9,431,679 B2 | 8/2016 | Kwon et al. | |
| 10,879,518 B1* | 12/2020 | Holmdahl | H01M 10/0431 |
| 2013/0130071 A1 | 5/2013 | Adachi et al. | |
| 2013/0224562 A1* | 8/2013 | Momo | H01M 10/0472 429/149 |
| 2014/0050958 A1 | 2/2014 | Kwon et al. | |
| 2014/0099525 A1 | 4/2014 | Kwon et al. | |
| 2014/0255739 A1* | 9/2014 | Maleki | H01M 10/0436 429/94 |
| 2014/0370356 A1 | 12/2014 | Yi | |
| 2015/0037658 A1* | 2/2015 | Maeda | H01M 50/533 429/161 |
| 2015/0340733 A1* | 11/2015 | Kwon | H01M 10/0583 429/94 |
| 2015/0372353 A1* | 12/2015 | Ryu | H01M 10/058 429/61 |
| 2016/0079579 A1* | 3/2016 | Jung | H01M 10/52 29/623.2 |
| 2016/0308180 A1 | 10/2016 | Kohda | |
| 2017/0092906 A1* | 3/2017 | Park | H01M 50/543 |
| 2018/0013109 A1 | 1/2018 | Bin et al. | |
| 2018/0026254 A1* | 1/2018 | Oh | H01M 50/20 429/153 |
| 2018/0026308 A1* | 1/2018 | Yamada | H01M 50/538 29/623.1 |
| 2019/0259979 A1* | 8/2019 | Ryu | H01M 10/04 |

FOREIGN PATENT DOCUMENTS

| | | | | |
|---|---|---|---|---|
| CN | 106356497 A | * | 1/2017 | ........ H01M 10/0587 |
| JP | 2013110038 A | | 6/2013 | |
| JP | 2014523629 A | | 9/2014 | |
| JP | 2014524131 A | | 9/2014 | |
| JP | 2015176782 A | | 10/2015 | |
| JP | 2016207307 A | | 12/2016 | |
| KR | 2019087871 A | * | 7/2019 | ........ H01M 10/0413 |
| WO | WO-2018131377 A1 | * | 7/2018 | ............ H01M 10/04 |

OTHER PUBLICATIONS

Written Opinion of the International Searching Authority issued in PCT/JP2017/039452, dated Dec. 12, 2017.

Chinese Office Action and Search Report issued for Chinese Application No. 201780074947.9, dated Sep. 1, 2021.

* cited by examiner

SECONDARY BATTERY

CROSS REFERENCE TO RELATED APPLICATIONS

The present application is a continuation of International application No. PCT/JP2017/039452, filed Oct. 31, 2017, which claims priority to Japanese Patent Application No. 2016-237025, filed Dec. 6, 2016, the entire contents of each of which are incorporated herein by reference.

FIELD OF THE INVENTION

The present invention relates to a secondary battery.

BACKGROUND OF THE INVENTION

Secondary batteries that can be repeatedly charged and discharged have been used for various applications. For example, the secondary battery is used as a power source for electronic devices such as a smartphone and a laptop computer.

In recent years, demands for thickness reduction and downsizing of electronic devices have further increased. Along with this, it is required to efficiently provide a board or the like in a secondary battery in an electronic device. With respect to this, Patent Document 1 discloses a secondary battery having a stepped region.

Patent Document 1: Japanese Translation of PCT International Application Publication No. 2014-523629

SUMMARY OF THE INVENTION

The inventors of the present application have found that when a secondary battery having a stepped region is used, specifically when a secondary battery having a step surface is connected to a board, the proportion occupied by the secondary battery and the board in the electronic device is not sufficiently low.

It is thus an object of the present invention to provide a secondary battery having a stepped region capable of reducing the secondary battery and/or board size when the secondary battery is connected to the board.

In order to achieve the above object, the present disclosure provides a secondary battery including an electrode assembly having a positive electrode, a negative electrode, and a separator arranged between the positive electrode and the negative electrode, an electrolyte, and an exterior body which houses the electrode assembly and the electrolyte. The exterior body has at least two step portions adjacent to each other, the at least two step portions having top surfaces with different heights, the at least two step portions including a low step portion and a high step portion, wherein a stepped surface is formed between a top surface of the low step portion having a relatively low height and a top surface of the high step portion adjacent to the low step portion and having a relatively high height. According to some aspects, at least part of a board is arrangeable on the top surface of the low step portion.

According to some aspects, it is possible to reduce the size of the secondary battery when connected to the board.

DETAILED DESCRIPTION

The secondary battery has a structure in which an electrode assembly and an electrolyte are housed and sealed in an exterior body. In the present specification, the term "secondary battery" refers to a battery that can be repeatedly charged and discharged. Therefore, the secondary battery of the present invention is not excessively bound by its name, and for example, "power storage device" and the like can be included in the subject of the present invention. The electrode assembly includes a positive electrode, a negative electrode, and a separator arranged between the positive electrode and the negative electrode. Examples of types of electrode assemblies useful according to the present disclosure include a first type, a second type, and a third type.

Figure 13:
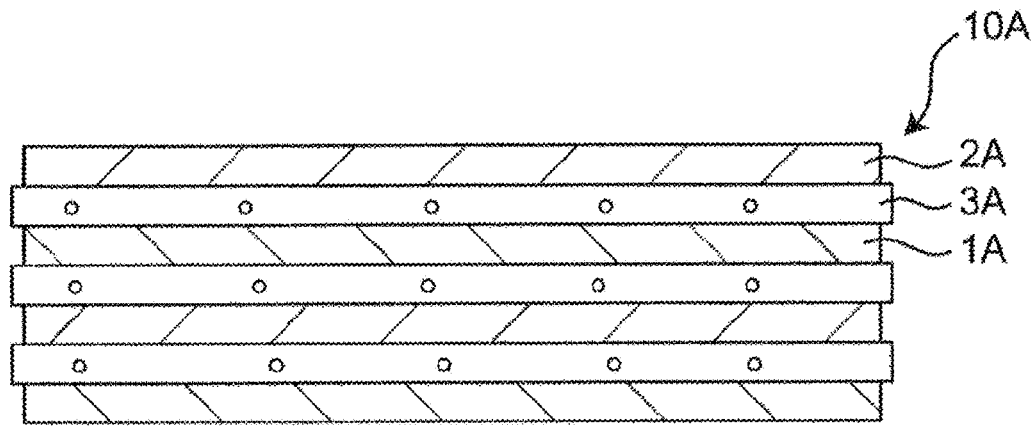
FIG. 13 is a cross-sectional view schematically showing a basic configuration of an electrode assembly having a planar laminated structure.

In the first type, an electrode assembly 10A may have a planar laminated structure in which a plurality of unitary electrode units including a positive electrode 1, 1A, a negative electrode 2, 2A and a separator 3, 3A are laminated (see FIG. 13).

Figure 14:
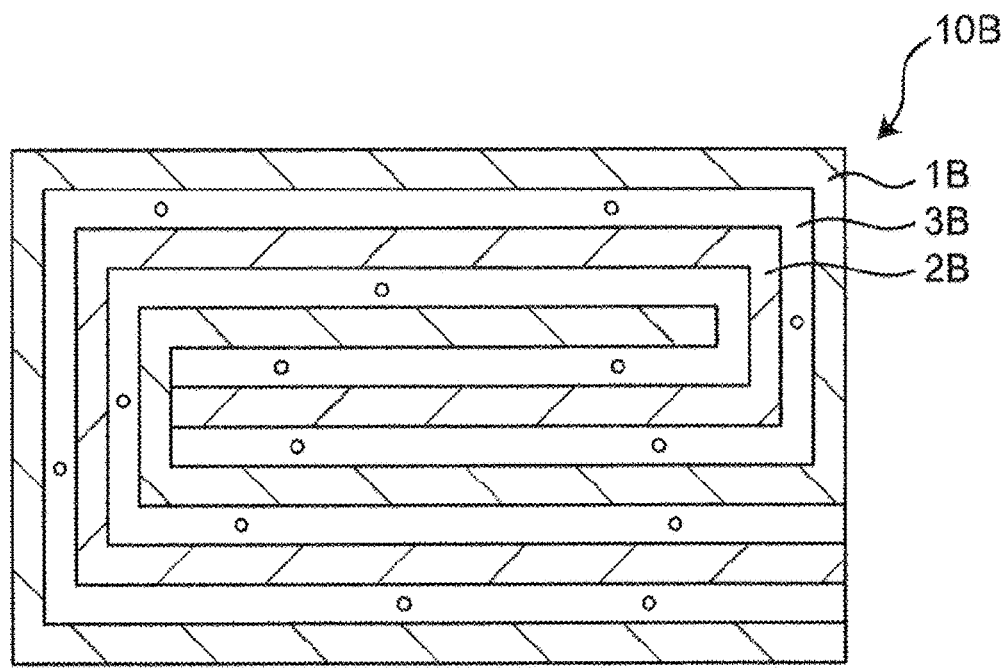
FIG. 14 is a cross-sectional view schematically showing a basic configuration of an electrode assembly having a winding structure.

In the second type, an electrode assembly 10B may have a winding structure in which the electrode unit including a positive electrode 1, 1B, a negative electrode 2, 2B and a separator 3, 3B are wound in a roll shape (see FIG. 14).

In the third type, the electrode assembly may have a so-called stack-and-fold structure formed by folding the electrode unit comprising a positive electrode, a negative electrode, and a separator, with a negative electrode. According to some aspects, in the third type, the electrode unit is laminated and extends in one direction.

According to some aspects, the exterior body may take the form of a conductive hard case or a flexible case (such as a pouch). When the form of the exterior body is a flexible case (e.g., a pouch or the like), each of the plurality of positive electrodes may be connected to the cathode external terminal via a cathode current collector lead. The cathode external terminal may be fixed to the exterior body by a seal portion, and the seal portion may prevent electrolyte leakage. Similarly, each of the plurality of negative electrodes may be connected to the anode external terminal via the anode current collector lead. The anode external terminal may be fixed to the exterior body by a seal portion, and the seal portion may prevent electrolyte leakage. However, it should be understood that the present invention is not necessarily limited to the above configuration. For example, the cathode current collector lead connected to each of the plurality of positive electrodes may have the function of the cathode external terminal and/or the anode current collector lead connected to each of the plurality of negative electrodes may have the function of the anode external terminal.

When the form of the exterior body is a conductive hard case, each of the plurality of positive electrodes may be connected to the cathode external terminal via a cathode current collector lead. The cathode external terminal may be fixed to the exterior body by a seal portion, and the seal portion may prevent electrolyte leakage.

Figure 15:
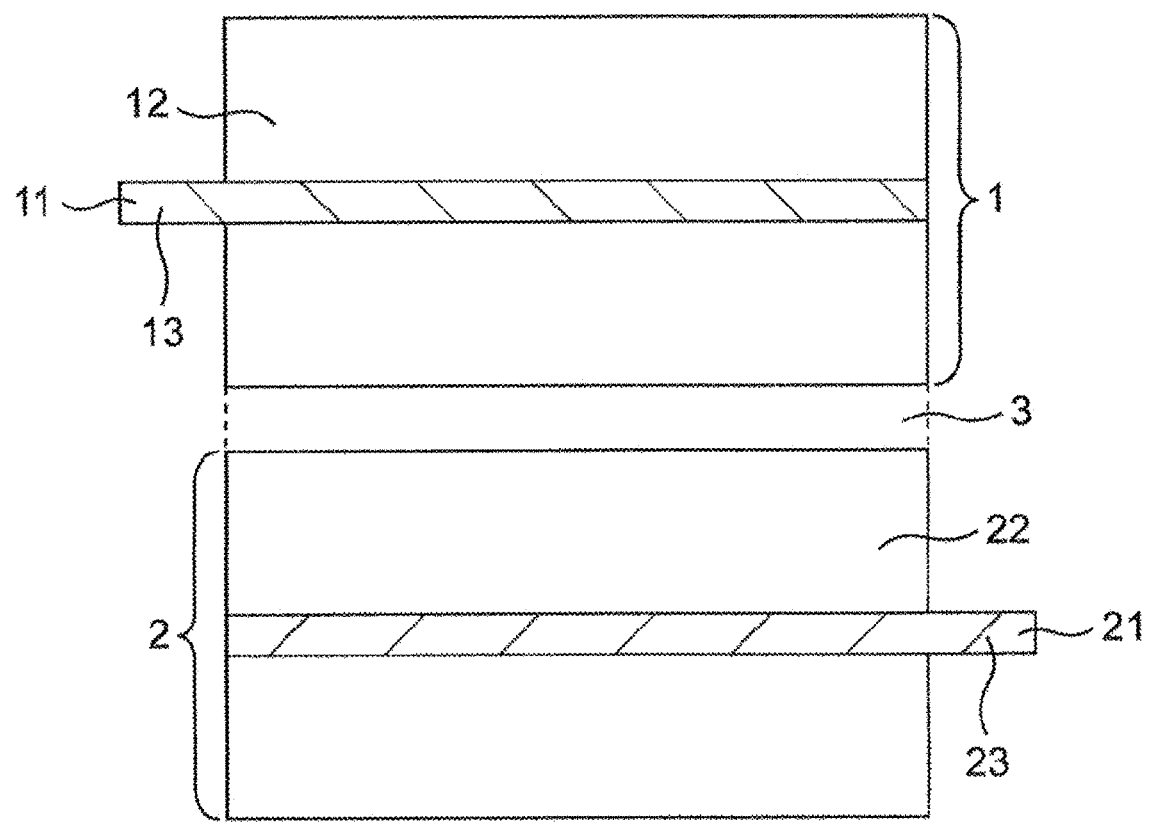
FIG. 15 is a cross-sectional view schematically showing a specific configuration of an electrode assembly.

The positive electrode 1 may comprise at least a cathode current collector 11 and a cathode material layer (see FIG. 15), and the cathode material layer 12 may be provided on at least one side of the cathode current collector 11. A cathode lead tab 13 may be positioned on the portion of the cathode current collector 11 where the cathode material layer 12 is not provided, that is, the end of the cathode current collector 11. The cathode material layer 12 may contain a cathode active substance as an electrode active material.

The negative electrode 2 may comprise at least an anode current collector 21 and an anode material layer 22 (see FIG. 15), and the anode material layer 22 may be provided on at least one side of the anode current collector 21. An anode lead tab 23 may be positioned on the portion of the anode current collector 21 where the anode material layer 22 is not provided, that is, the end of the anode current collector 21. The anode material layer 22 may contain an anode active substance as an electrode active material.

The cathode active substance contained in the cathode material layer 12 and the anode active substance contained in the anode material layer 22 may be substances directly involved in the transfer of electrons in the secondary battery and are main substances of the positive and negative electrodes which are responsible for charging and discharging the battery (that is, a cell reaction). In particular, ions are generated in the electrolyte due to the cathode active substance contained in the cathode material layer 12 and the anode active substance contained in the anode material layer 22, and such ions are transferred between the positive electrode 1 and the negative electrode 2 to transfer electrons, resulting in charging and discharging. According to some aspects, the cathode material layer 12 and the anode material layer 22 are layers capable of storing and releasing, for example, lithium ions. That is, according to some aspects, lithium ions move between the positive electrode 1 and the negative electrode 2 via the electrolyte to charge and discharge the secondary battery. When lithium ions are involved in charging and discharging, the secondary battery may be referred to as a lithium ion battery.

The cathode active substance of the cathode material layer 12, which may comprise, for example, a granular material, may include a binder (also referred to as a "binding material") for sufficient contact between grains and shape retention in the cathode material layer 12. Furthermore, a conductive auxiliary agent may be contained in the cathode material layer 12 in order to facilitate transmission of electrons for promoting the cell reaction. Similarly, the anode active substance of the anode material layer 22, which may comprise, for example, a granular material, may include a binder for sufficient contact between grains and shape retention, and a conductive auxiliary agent for smooth transfer of electrons promoting a cell reaction may be included in the anode material layer 22. According to some aspects, the cathode material layer 12 and the anode material layer 22 may alternatively be referred to as "cathode mixture material layer" and "anode mixture material layer", respectively.

According to some aspects, the cathode active substance may be a substance capable of storing and releasing lithium ions. In this respect, the cathode active substance may be, for example, a lithium-containing composite oxide. More specifically, the cathode active substance may be a lithium transition metal composite oxide containing lithium and at least one transition metal selected from the group consisting of cobalt, nickel, manganese, and iron. That is, in the cathode material layer 12 of the secondary battery, such a lithium transition metal composite oxide may be included as a cathode active substance. For example, the cathode active substance may be lithium cobalt oxide, lithium nickel oxide, lithium manganate, lithium iron phosphate, a material in which some of their transition metals are replaced with another metal, or a combination thereof. Although such a cathode active substance may be included as a single material, two or more materials may be contained in combination. According to some aspects, the cathode active substance contained in the cathode material layer 12 may be lithium cobalt oxide.

The binder optionally contained in the cathode material layer 12 is not particularly limited, but examples thereof may include at least one selected from the group consisting of polyvinylidene fluoride, vinylidene fluoride-hexafluoropropylene copolymer, vinylidene fluoride-tetrafluoroethylene copolymer, polytetrafluoroethylene, and combinations thereof. The conductive auxiliary agent optionally contained in the cathode material layer 12 is not particularly limited, but examples thereof may include at least one selected from the group consisting of carbon black such as thermal black, furnace black, channel black, ketjen black and acetylene black, carbon fiber such as graphite, carbon nanotube and vapor phase growth carbon fiber, metal powder such as copper, nickel, aluminum and silver, polyphenylene derivative, and combinations thereof. According to some aspects, the binder of the cathode material layer 12 may be polyvinylidene fluoride and/or the conductive auxiliary agent of the cathode material layer 12 may be carbon black. Although it is merely an example, the binder and the conductive auxiliary agent of the cathode material layer 12 may be a combination of polyvinylidene fluoride and carbon black.

The anode active substance may be a substance capable of storing and releasing of lithium ions. In this respect, the anode active substance may be, for example, various carbon materials, oxides, lithium alloys, or a combination thereof.

Examples of the various carbon materials of the anode active substance may include graphite (e.g., natural graphite, artificial graphite), hard carbon, soft carbon, diamond-like carbon, and combinations thereof. In particular, graphite may be selected because it has high electron conductivity and excellent adhesion to an anode current collector 21 and the like. Examples of the oxide of the anode active substance may include at least one selected from the group consisting of silicon oxide, tin oxide, indium oxide, zinc oxide, lithium oxide, and combinations thereof. The lithium alloy of the anode active substance may be any metal which can be alloyed with lithium, such as a binary, ternary, or higher alloy of lithium and a metal such as Al, Si, Pb, Sn, In, Bi, Ag, Ba, Ca, Hg, Pd, Pt, Te, Zn, La, and combinations thereof. According to some aspects, the oxide is amorphous as its structural form such that degradation due to non-uniformity (such as grain boundaries or defects) is limited or prevented. Although it is merely an example, the anode active substance of the anode material layer 22 may be artificial graphite.

The binder optionally contained in the anode material layer 22 is not particularly limited, but examples thereof may include at least one selected from the group consisting of styrene butadiene rubber, polyacrylic acid, polyvinylidene fluoride, polyimide resin, polyamideimide resin, and combinations thereof. For example, the binder contained in the anode material layer 22 may be styrene butadiene rubber. The conductive auxiliary agent optionally contained in the anode material layer 22 is not particularly limited, but examples thereof may include at least one selected from the group consisting of carbon black such as thermal black, furnace black, channel black, ketjen black and acetylene black, carbon fiber such as graphite, carbon nanotube and vapor phase growth carbon fiber, metal powder such as copper, nickel, aluminum and silver, polyphenylene derivative, and combinations thereof. According to some aspects, the anode material layer 22 may contain a component attributable to the thickener component used to manufacture the battery (for example, carboxymethyl cellulose).

Although it is merely an example, the anode active substance and the binder in the anode material layer 22 may be a combination of artificial graphite and styrene butadiene rubber.

The cathode current collector 11 and the anode current collector 21 used for the positive electrode 1 and the negative electrode 2 are members that contribute to the collection and supply of electrons generated in the active substance due to the cell reaction. Such a current collector may be a sheet-like metal member and may have a porous or perforated form. For example, the current collector may be a metal foil, a punching metal, a net, an expanded metal, or a combination thereof. The cathode current collector 11 used for the positive electrode 1 may comprise a metal foil containing at least one selected from the group consisting of aluminum, stainless steel, nickel, and combinations thereof, and may be, for example, an aluminum foil. The anode current collector 21 used for the negative electrode 2 may comprise a metal foil containing at least one selected from the group consisting of copper, stainless steel, nickel, and combinations thereof, and may be, for example, a copper foil.

The separator 3 used for the positive electrode 1 and the negative electrode 2 may be a member configured to prevent short circuit (e.g., a result of contact between the positive and negative electrodes), retain the electrolyte, or a combination thereof. According to some aspects, separator 3 may be a member that passes ions while preventing electronic contact between the positive electrode 1 and the negative electrode 2. The separator 3 may be a porous or microporous insulating member and have a film form due to its small thickness. Although it is merely an example, a microporous membrane made of polyolefin may be used as a separator. In this regard, the microporous membrane used as the separator 3 may be, for example, a polyolefin containing only polyethylene (PE) or polypropylene (PP). Furthermore, the separator 3 may be a laminate comprising a microporous membrane made of PE and a microporous membrane made of PP. The surface of the separator 3 may be covered with an inorganic particle coat layer and/or an adhesive layer. The surface of the separator may have adhesion. It should be noted that the separator 3 should not be particularly restricted by its name, and may be, for example, a solid electrolyte, a gel electrolyte, insulating inorganic particles, or a combination thereof. According to some aspects, in order to improve the handling of the electrode, the separator 3 and the electrode (i.e., positive electrode 1 and/or negative electrode 2) may be bonded. Adhesion between the separator 3 and the electrode may be achieved by using an adhesive separator as the separator 3, or by applying an adhesive binder and/or thermocompression bonding on the electrode material layer (i.e., cathode material layer 12 and/or node material layer 22). Examples of the adhesive that provides adhesiveness to the separator 3 or the electrode material layer include polyvinylidene fluoride, an acrylic adhesive, and combinations thereof.

When the positive electrode 1 and the negative electrode 2 have a layer capable of absorbing and releasing lithium ions, the electrolyte may be a nonaqueous electrolyte such as an organic electrolyte and/or an organic solvent. Metal ions released from the electrodes (i.e., positive electrode 1 and negative electrode 2) are present in the electrolyte, and therefore the electrolyte helps the movement of metal ions in the cell reaction.

The nonaqueous electrolyte may be an electrolyte containing a solvent and a solute. According to some aspects, at least carbonate may be selected as a specific solvent for the nonaqueous electrolyte. The carbonate may comprise cyclic carbonates and/or chain carbonates. Although not particularly limited, examples of cyclic carbonates may include at least one selected from the group consisting of propylene carbonate (PC), ethylene carbonate (EC), butylene carbonate (BC), vinylene carbonate (VC), and combinations thereof. Examples of chain carbonates may include at least one selected from the group consisting of dimethyl carbonate (DMC), diethyl carbonate (DEC), ethyl methyl carbonate (EMC), dipropyl carbonate (DPC), and combinations thereof. Although it is merely an example, a combination of cyclic carbonates and chain carbonates may be used as the nonaqueous electrolyte, and, for example, a mixture of ethylene carbonate and diethyl carbonate may be used. As a specific nonaqueous electrolyte solute, for example, a Li salt such as $LiPF_6$ or $LiBF_4$ may used.

Any current collector lead used in the field of secondary batteries may be used as the cathode current collector lead and the anode current collector lead. Such a current collector lead may be made of a material from which electron transfer can be achieved, and may be made of, for example, a conductive material such as aluminum, nickel, iron, copper, stainless steel, or a combination thereof. According to some aspects, the cathode current collector lead may be made of aluminum and the anode current collector lead may be made of copper. The form of the cathode current collector lead and/or the anode current collector lead is not particularly limited. For example, they may be in the shape of a line or a plate.

Any external terminal used in the field of secondary batteries can be used as the external terminal. Such an external terminal may be made of a material in which electron transfer can be achieved, and is generally made of a conductive material such as aluminum, nickel, iron, copper, stainless steel, or a combination thereof. The external terminal 5 may be electrically and directly connected to the board or may be electrically and indirectly connected to the board via another device. However, the present invention is not necessarily limited to the above configuration. According to some aspects, the cathode current collector lead electrically connected to each of the plurality of positive electrodes may have the function of the cathode external terminal and/or the anode current collector lead electrically connected to each of the plurality of negative electrodes may have the function of the anode external terminal.

The exterior body may be in the form of a conductive hard case or a flexible case (such as a pouch) as described above.

The conductive hard case may comprise a main body and a lid. The main body may comprise a bottom portion and a side portion constituting the bottom surface of the exterior body. The main body and the lid may be sealed after the electrode assembly, the electrolyte, the current collector lead, and the external terminal are housed. The sealing method is not particularly limited, and for example, a laser irradiation method may be used. Any material that can constitute a hard case exterior body in the field of secondary batteries can be used as the material constituting the main body and the lid. Such a material may be any material in which electron transfer can be achieved, examples of which include materials comprising a conductive material such as aluminum, nickel, iron, copper, stainless steel, or a combination thereof. The dimensions of the main body and the lid may be determined mainly in accordance with the dimensions of the electrode assembly. For example, when the electrode assembly is housed, the electrode assembly may have dimensions that prevent movement (e.g., shift) of the electrode assembly in the exterior body. Breakage of the electrode assembly may be prevented by preventing movement of the electrode assembly, thereby improving the safety of the secondary battery.

The flexible case may comprise a flexible sheet. The flexible sheet may have a softness sufficient to achieve folding of the seal portion and may comprise a plastic sheet. The plastic sheet may comprise a sheet configured such that deformation by an external force is maintained when the external force is applied and then removed. For example, a laminate film may be used. According to some aspects, a flexible pouch made of a laminate film may be manufactured by laminating two laminate films and heat sealing the peripheral edge portion thereof. As the laminate film, a film formed by laminating a metal foil and a polymer film may be used. According to some aspects, a three-layered film comprising a polymer film as an outer layer, a metal foil, and a polymer film as an inner layer may be used. The outer layer polymer film may prevent the metal foil from being damaged due to permeation and/or contact with moisture. According to some aspects, a polymer such as polyamide or polyester may be used. The metal foil may prevent permeation of moisture and gas, and may comprise copper, aluminum, stainless steel, or a combination thereof. The inner layer polymer film may protect the metal foil from the electrolyte contained therein and may melt the metal foil at the time of heat sealing to enclose the electrolyte. According to some aspects, polyolefin or acid-modified polyolefin may be used.

According to some aspects, the secondary battery of the present disclosure comprises a stepped region.

Figure 1:
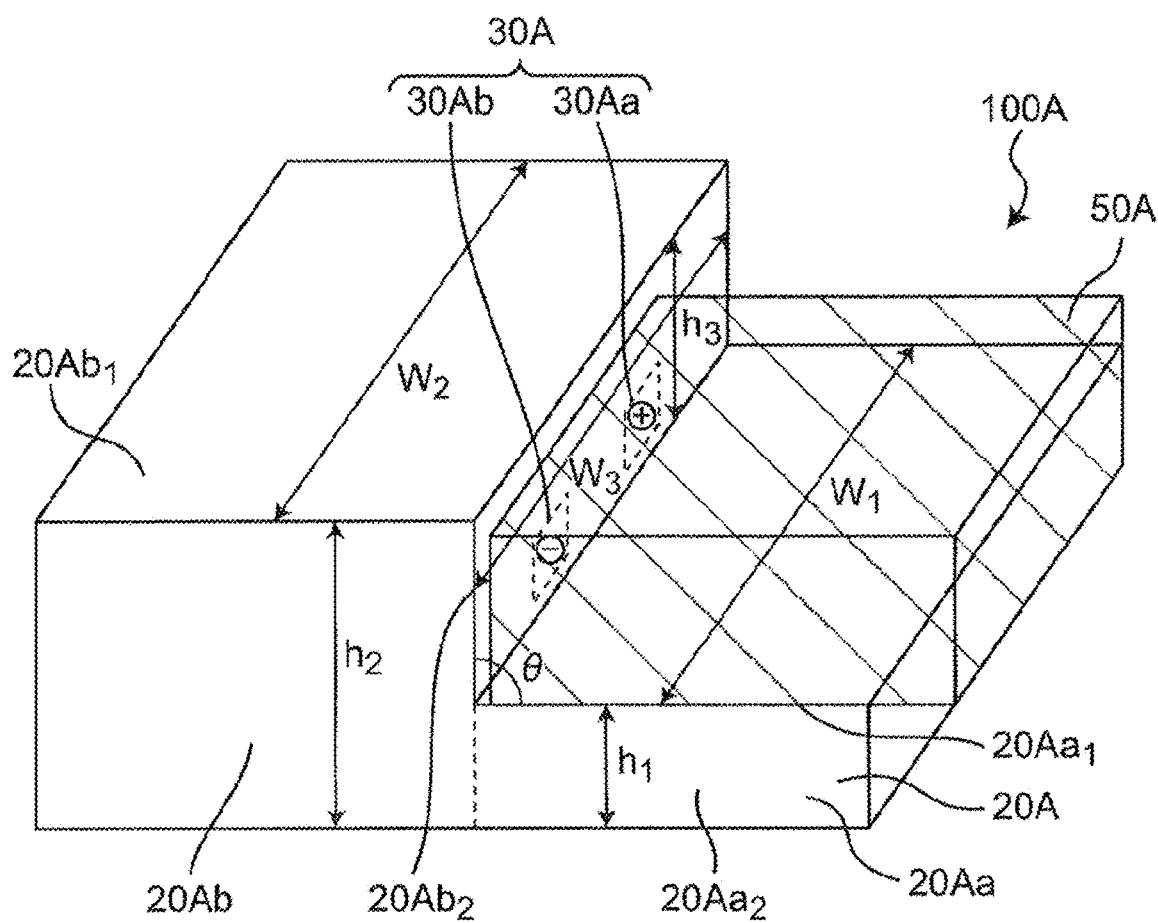
FIG. 1 is a perspective view schematically showing a secondary battery according to aspects of the present invention.

FIG. 1 is a perspective view schematically showing a secondary battery according to aspects of the present invention.

In particular, secondary battery 100A may have a structure in which an electrode assembly and an electrolyte are housed and sealed in an exterior body 20A.

The exterior body 20A may comprise at least two step portions. For example, the exterior body 20A may comprise at least first step portion 20Aa and second step portion 20Ab. The two step portions may be configured so as to be adjacent to each other and to have mutually different top surface heights. The "height of the top surface" or "top surface height" refers to the linear dimension along the substantially vertical direction between the bottom surface and the top surface of the step portion, which is a component of the exterior body.

According to some aspects, first step portion 20Aa and second step portion 20Ab are adjacent to each other, and the height $h_2$ of the top surface $20Ab_1$ of the second step portion 20Ab is larger than the height $h_1$ of the top surface $20Aa_1$ of the first step portion 20Aa. Because the height level of the top surface $20Aa_1$ of the first step portion 20Aa and the height level of the top surface $20Ab_1$ of the second step portion 20Ab are different from each other, stepped surface $20Ab_2$ is formed between the top surface $20Aa_1$ of the first step portion 20Aa and the top surface $20Ab_1$ of the second step portion 20Ab. According to some aspects, first step portion 20Aa and second step portion 20Ab are configured such that the width dimension $W_2$ (longitudinal direction) of the top surface $20Ab_1$ of the second step portion 20Ab is equal to the width dimension $W_1$ (longitudinal direction) of the top surface $20Aa_1$ of the first step portion 20Aa.

According to some aspects, stepped surface $20Ab_2$ has a height $h_3$ and a width dimension (longitudinal direction) $W_3$. The height $h_3$ of the stepped surface $20Ab_2$ is equal to the difference between the height $h_2$ of the top surface $20Ab_1$ of the second step portion 20Ab and the height $h_1$ of the top surface $20Aa_1$ of the first step portion 20Aa. According to some aspects, width $W_3$ (longitudinal direction) of the stepped surface $20Ab_2$ is set to be equal to the width dimension $W_2$ (longitudinal direction) of the top surface $20Ab_1$ of the second step portion 20Ab and the width dimension $W_1$ (longitudinal direction) of the top surface $20Aa_1$ of the first step portion 20Aa.

The stepped surface $20Ab_2$ may be configured to be continuous with the top surface $20Aa_1$ of the first step portion 20Aa. Specifically, the top surface $20Aa_1$ of the first step portion 20Aa may be continuous with the stepped surface $20Ab_2$ so as to extend in a direction different from the extending direction of the stepped surface $20Ab_2$. Although it is not particularly limited, the top surface $20Aa_1$ of the first step portion 20Aa may extend in a direction perpendicular to the extending direction of the stepped surface $20Ab_2$. That is, the angle θ between the stepped surface $20Ab_2$ and the top surface $20Aa_1$ of the first step portion 20Aa may be 90 degrees. According to some aspects, the angle θ between the stepped surface $20Ab_2$ and the top surface $20Aa_1$ of the first step portion 20Aa may be between 30 degrees and 150 degrees, optionally between 50 degrees and 130 degrees, and optionally between 70 degrees and 110 degrees, based on the arrangement of the board.

As shown in FIG. 1, at least part of a board 50A may be provided on the top surface $20Aa_1$ of the first step portion 20Aa. That is, at least part of the board 50A may be provided in a space region formed between the stepped surface $20Ab_2$ and the top surface $20Aa_1$ of the first step portion 20Aa (i.e., the stepped region as described above).

According to some aspects, when at least part of the board 50A is provided on the top surface $20Aa_1$ of the first step portion 20Aa, it is possible to effectively utilize the space region formed between the stepped surface $20Ab_2$ and the top surface $20Aa_1$ of the first step portion 20Aa. In this way, it is possible to efficiently reduce the size of the secondary battery when the board 50A and the secondary battery 100A are integrated.

Figure 2:
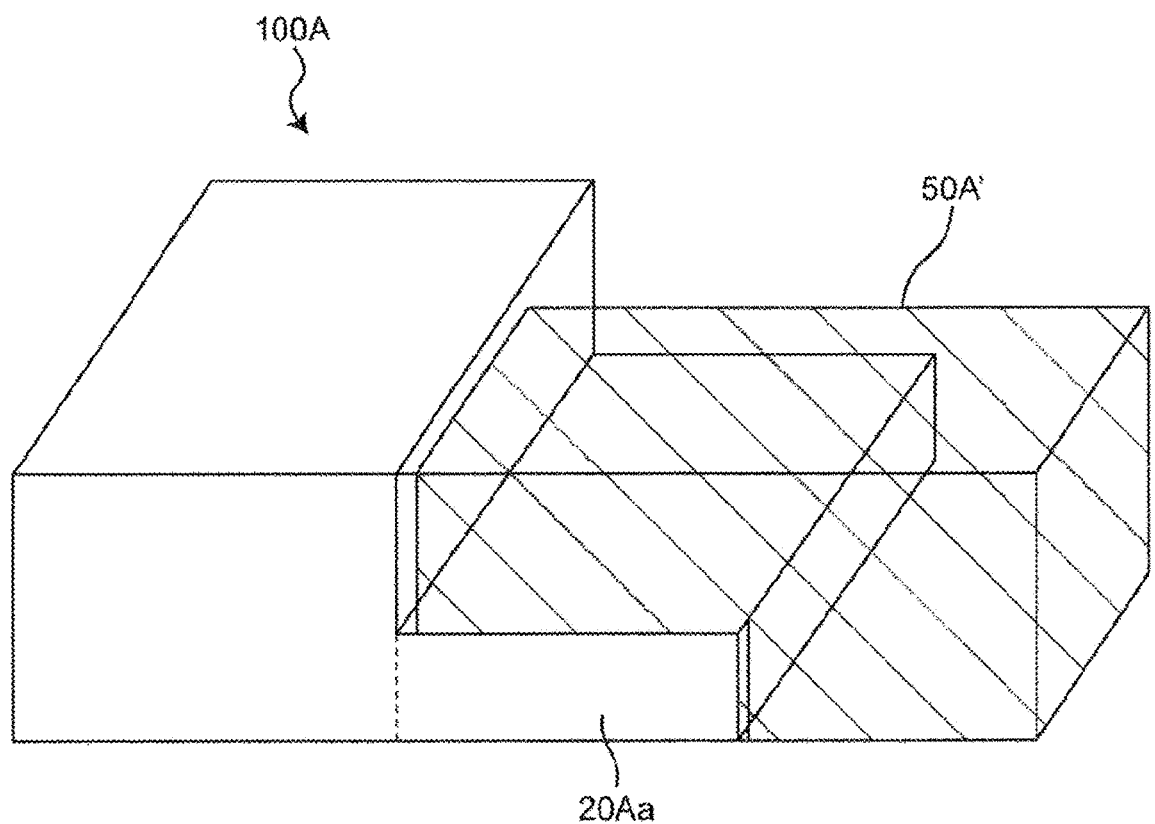
FIG. 2 is a perspective view schematically showing a board arranged in a secondary battery according to aspects of the present invention.
Figure 3:
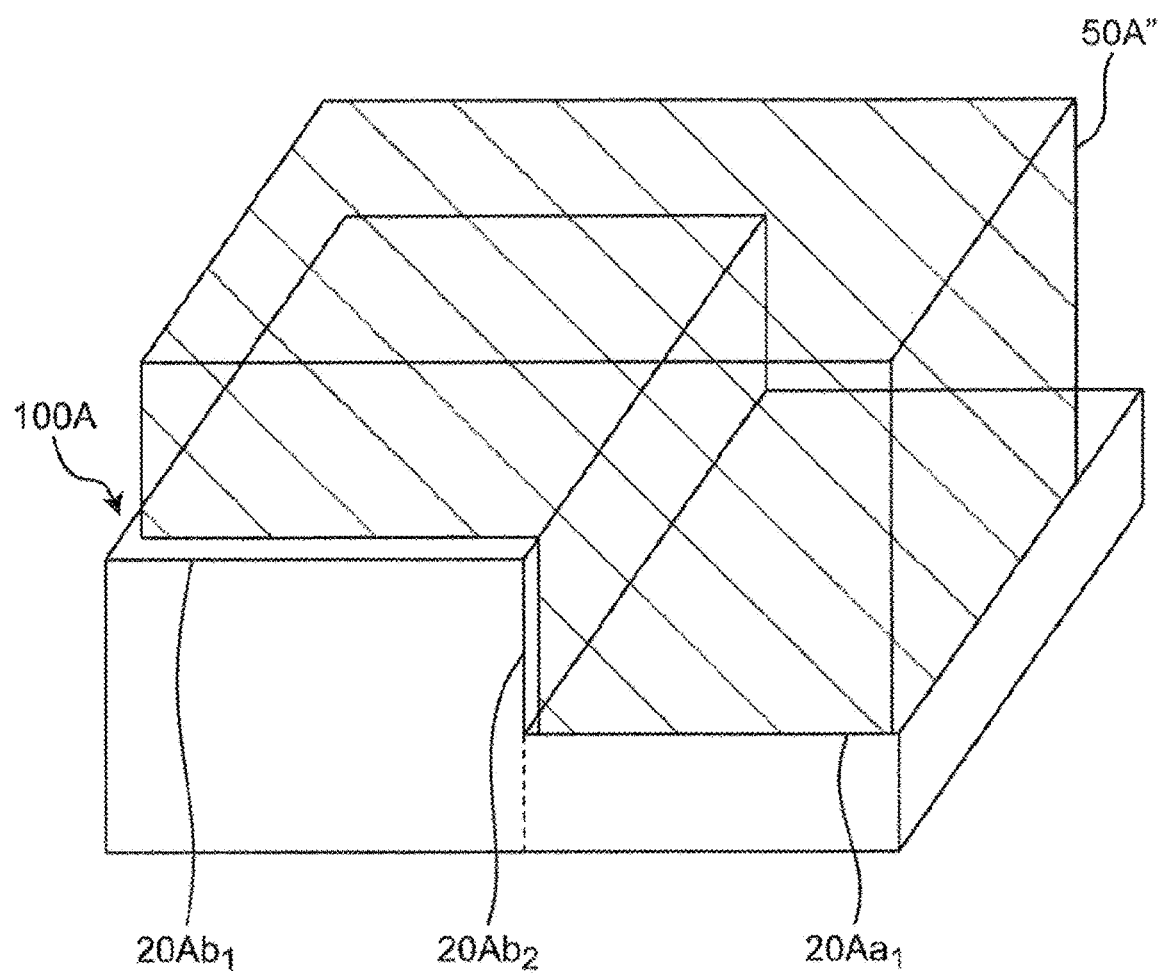
FIG. 3 is a perspective view schematically showing a board arranged in a secondary battery according to aspects of the present invention.

According to some aspects, the height of the board 50A may be equal to or less than the height of the stepped surface $20Ab_2$ and/or its width may be equal to or less than the width dimension of the top surface $20Aa_1$ of the first step portion 20Aa. However, the present invention is not necessarily limited to this configuration. For example, according to some aspects, a board 50A' having a shape covering one side surface of the first step portion 20Aa may be used, as shown in FIG. 2. According to some aspects, a board 50A" having a shape in contact with any of the top surface $20Aa_1$ of the first step portion 20Aa, the top surface $20Ab_1$ of the second step portion 20Ab, and the stepped surface $20Ab_2$ may be used, as shown in FIG. 3.

According to some aspects, an external terminal 30A (i.e., cathode external terminal 30Aa and anode external terminal 30Ab) for a secondary battery may be provided on the surface of the exterior body 20A. For example, the external terminal 30A may be configured to be exposed to the stepped surface $20Ab_2$. However, the present invention is not necessarily limited to this configuration. For example, the external terminal 30A may be configured to be exposed on the top surface $20Aa_1$ of the first step portion 20Aa and the end side surface $20Aa_2$ of the first step portion 20Aa. When the external terminal 30A is present in any of such positions, the external terminal 30A may be arranged close to the board 50A so that the length of the wiring connecting the external terminal 30A and the board 50A may be relatively short. As a result, power loss and space loss between the external terminal 30A and the board 50A may be reduced as compared with the case where the length of the wiring is relatively long.

According to some aspects, board 50A may be a rigid board or a flexible board. Any rigid board used in the field of boards used together with a secondary battery can be used as the rigid board, and for example, a glass-epoxy resin board can be used. Examples of the board include a circuit board such as a printed board and a protective circuit board, a semiconductor board such as a silicon wafer, a glass board such as a display panel, and a combination thereof. When the board is a protective circuit board for preventing overcharge, overdischarge, and overcurrent of the secondary battery, a secondary battery pack may configured from the protective circuit board and the secondary battery.

Figure 4:
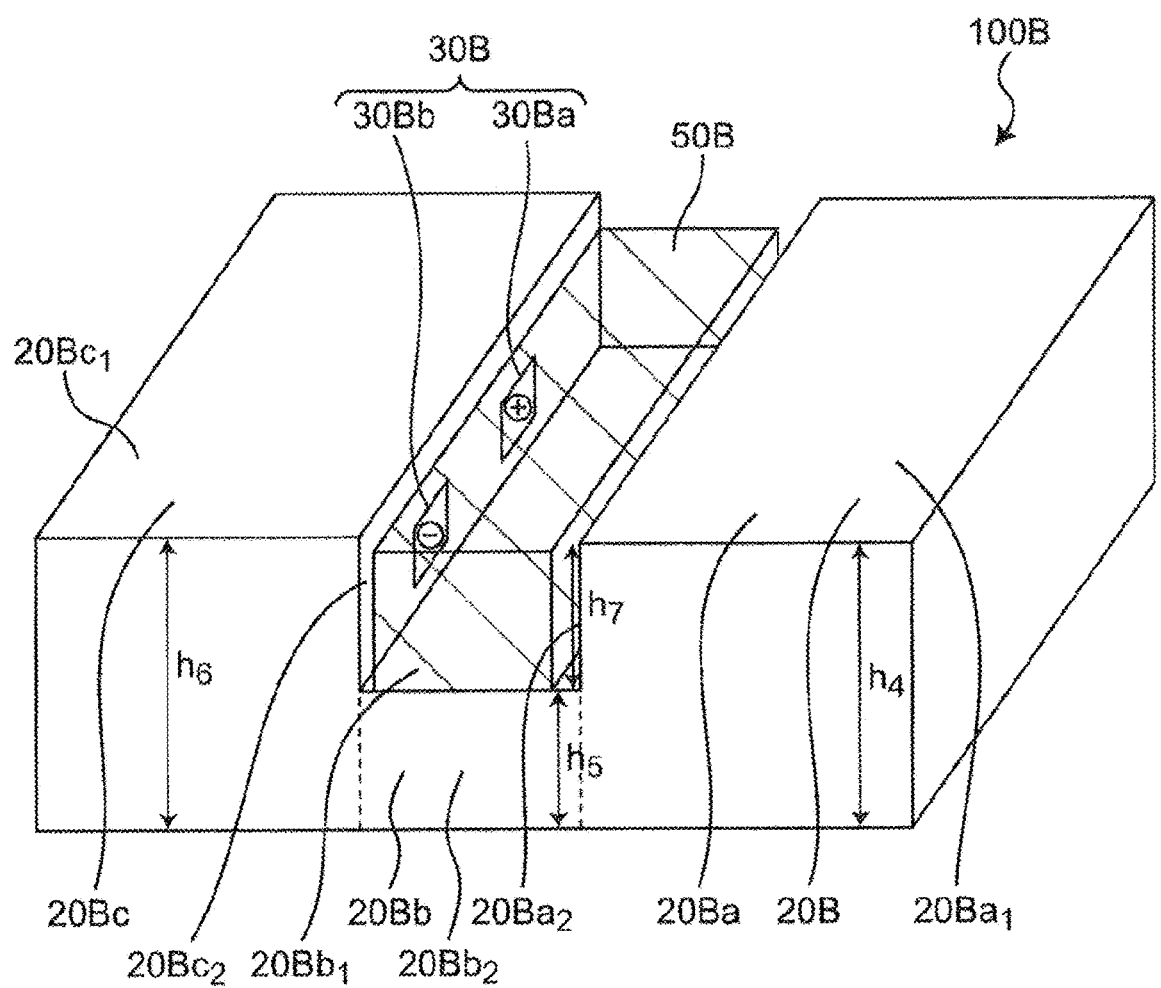
FIG. 4 is a perspective view schematically showing a secondary battery according to aspects of the present invention.

FIG. 4 is another perspective view schematically showing a secondary battery according to the present invention.

As shown in FIG. 4, secondary battery 100B may have a structure in which the electrode assembly and the electrolyte are housed and sealed in an exterior body 20B.

The exterior body 20B may include, for example, three step portions, i.e., a first step portion 20Ba, a second step portion 20Bb, and a third step portion 20Bc.

The first step portion 20Ba and the second step portion 20Bb are adjacent to each other, and the height $h_5$ of the top surface $20Bb_1$ of the second step portion 20Bb is smaller than the height $h_4$ of the top surface $20Ba_1$ of the first step portion 20Ba. Because the height level of the top surface $20Ba_1$ of the first step portion 20Ba and the height level of the top surface $20Bb_1$ of the second step portion 20Bb are different from each other, the first stepped surface $20Ba_2$ is formed between the top surface $20Ba_1$ of the first step portion 20Ba and the top surface $20Bb_1$ of the second step portion 20Bb.

The second step portion 20Bb and the third step portion 20Bc are also adjacent to each other, and the height $h_5$ of the top surface $20Bb_1$ of the second step portion 20Bb is smaller than the height $h_6$ of the top surface $20Bc_1$ of the third step portion 20Bc. Because the height level of the top surface $20Bb_1$ of the second step portion 20Bb and the height level of the top surface $20Bc_1$ of the third step portion 20Bc are different from each other, the second stepped surface $20Bc_2$ is formed between the top surface $20Bb_1$ of the second step portion 20Bb and the top surface $20Bc_1$ of the third step portion 20Bc.

The first stepped surface $20Ba_2$ has a height $h_7$. The height $h_7$ of the first stepped surface $20Ba_2$ is equal to the difference between the height $h_4$ of the top surface $20Ba_1$ of the first step portion 20Ba and the height $h_5$ of the top surface $20Bb_1$ of the second step portion 20Bb. The second stepped surface $20Bc_2$ may have the same height $h_7$. The height $h_7$ of the second stepped surface $20Bc_2$ is equal to the difference between the height $h_6$ of the top surface $20Bc_1$ of the third step portion 20Bc and the height $h_5$ of the top surface $20Bb_1$ of the second step portion 20Bb.

The first stepped surface $20Ba_2$ may be configured to be continuous with the top surface $20b1$ of the second step portion 20Bb. Specifically, the top surface $20Bb_1$ of the second step portion 20Bb may be continuous with the first stepped surface $20Ba_2$ so as to extend in a direction different from the extending direction of the first stepped surface $20Ba_2$. Although it is not particularly limited, the top surface $20Bb_1$ of the second step portion 20Bb may extend in a direction perpendicular to the extending direction of the first stepped surface $20Ba_2$. That is, the angle θ between the first stepped surface $20Ba_2$ and the top surface $20Bb_1$ of the second step portion 20Bb may be 90 degrees. According to some aspects, the angle θ between the first stepped surface $20Ba_2$ and the top surface $20Bb_1$ of the second step portion 20Bb may be between 30 degrees and 150 degrees, optionally between 50 and 130 degrees, and optionally between 70 and 110 degrees, based on the arrangement of the board.

Similarly, the second stepped surface $20Bc_2$ may be configured to be continuous with the top surface $20Bb_1$ of the second step portion 20Bb. Specifically, the top surface $20Bb_1$ of the second step portion 20Bb may be continuous with the second stepped surface $20Bc_2$ so as to extend in a direction different from the extending direction of the second stepped surface $20Bc_2$. Although it is not particularly limited, the top surface $20Bb_1$ of the second step portion 20Bb may extend in a direction perpendicular to the extending direction of the second stepped surface $20Bc_2$. That is, the angle θ between the second stepped surface $20Bc_2$ and the top surface $20Bb_1$ of the second step portion 20Bb may be 90 degrees. According to some aspects, the angle θ between the second stepped surface $20Bc_2$ and the top surface $20Cb_1$ of the second step portion 20Bb may be between 30 degrees and 150 degrees, optionally between 50 and 130 degrees, and optionally between 70 and 110 degrees, based on the arrangement of the board.

As shown in FIG. 4, a board 50B may be provided on the top surface $20Bb_1$ of the second step portion 20Bb. Specifically, the board 50B may be provided in a groove region formed between the first stepped surface 20Ba$_2$ and the second stepped surface 20Bc$_2$ facing each other and the top surface 20Bb$_1$ of the second step portion 20Bb. When the board 50B is provided on the top surface 20Ba$_1$ of the first step portion 20Ba, the board 50B is received in the groove region. In this way, it is possible to more efficiently reduce the size of the secondary battery when the board 50B and the secondary battery 100B are integrated.

An external terminal 30B (i.e., cathode external terminal 30Ba and anode external terminal 30Bb) for a secondary battery may be provided on the surface of the exterior body 20B. For example, the external terminal 30B may be configured to be exposed to the second stepped surface Bc$_2$. However, the invention is not necessarily limited to this configuration. For example, the external terminal 30B may be configured to be exposed on the first stepped surface 20Ba$_2$ or the top surface 20Bb$_1$ of the second step portion 20Bb. When the external terminal 30B is present in any of such positions, the external terminal 30B may arranged close to the board 50B so that the length of the wiring connecting the external terminal 30B and the board 50B may be relatively short. As a result, power loss and space loss between the external terminal 30B and the board 50B can be suppressed as compared with the case where the length of the wiring is relatively long. Furthermore, in the groove region, it is possible to more stably fix the board 50B compared with other configurations due to its shape.

Figure 5:
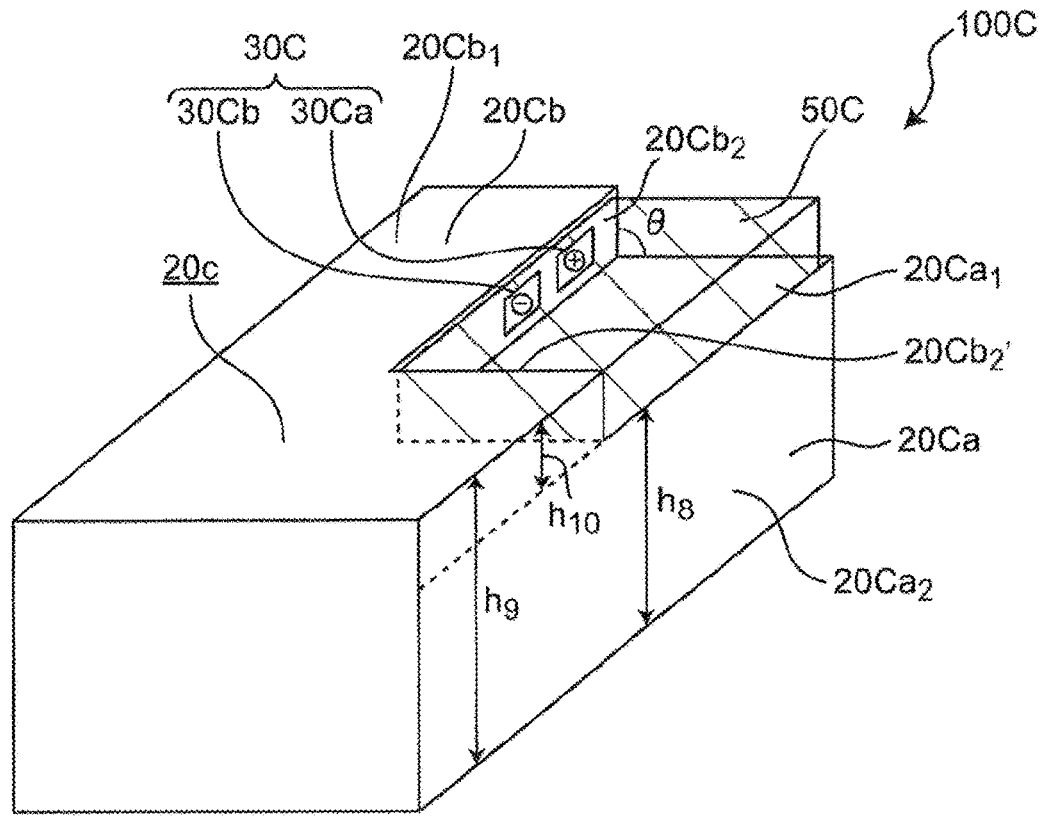
FIG. 5 is a perspective view schematically showing a secondary battery according to aspects of the present invention.
Figure 6:
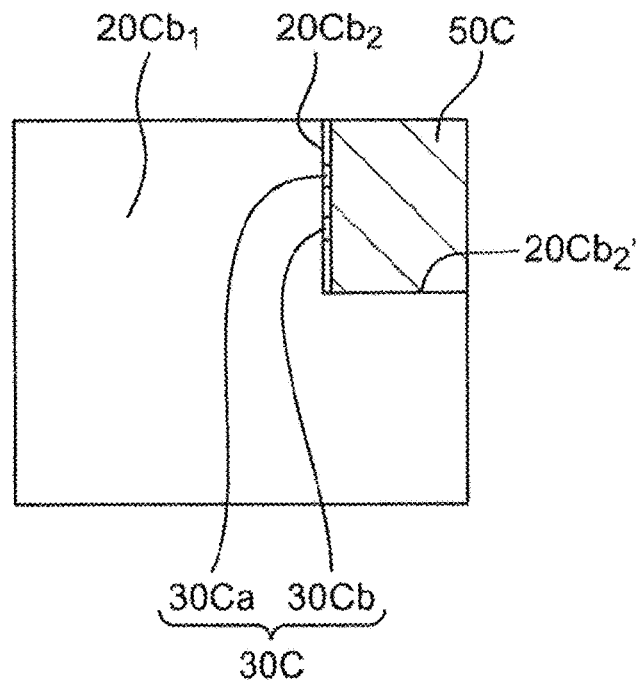
FIG. 6 is a plan view schematically showing a secondary battery according to aspects of the present invention.

FIG. 5 is another perspective view schematically showing a secondary battery according to the present invention. FIG. 6 is a plan view schematically showing a secondary battery according to the present invention.

As shown in FIG. 5, secondary battery 100C may have a structure in which the electrode assembly and the electrolyte are housed and sealed in an exterior body 20C.

The exterior body 20C may have at least two step portions. For example, the exterior body 20C may include a first step portion 20Ca and a second step portion 20Cb, as shown in FIG. 5. The two step portions may be adjacent to each other and have mutually different heights of the top surfaces. Specifically, the first step portion 20Ca and the second step portion 20Cb may be adjacent to each other, and the height h$_9$ of the top surface 20Cb$_1$ of the second step portion 20Cb may be larger than the height h$_8$ of the top surface 20Ca$_1$ of the first step portion 20Ca. Because the height level of the top surface 20Ca$_1$ of the first step portion 20Ca and the height level of the top surface 20Cb$_1$ of the second step portion 20Cb are different from each other, a stepped surface may be formed between the top surface 20Ca$_1$ of the first step portion 20Ca and the top surface 20Cb$_1$ of the second step portion 20Cb.

The stepped surface may be formed of the two surfaces as shown in FIG. 5. In particular, as shown in FIG. 6, the stepped surface does not extend in one direction, and one first stepped surface 20Cb$_2$ is continuous with the second stepped surface 20Cb$_2$' so as to extend in a direction different from the extending direction (i.e., the width direction) of the other second stepped surface 20Cb$_2$'.

Both the first stepped surface 20Cb$_2$ and the second stepped surface 20Cb$_2$' may have a height h$_{10}$. The height h$_{10}$ is equal to the difference between the height h$_9$ of the top surface 20Cb$_1$ of the second step portion 20Cb and the height h$_5$ of the top surface 20Ca$_1$ of the first step portion 20Ca.

Both of the first stepped surface 20Cb$_2$ and the second stepped surface 20Cb$_2$' may be configured to be continuous with the top surface 20Ca$_1$ of the first step portion 20Ca. Specifically, the top surface 20Ca$_1$ of the first step portion 20Ca may be contiguous with the two stepped surfaces so as to extend in a different direction from the extending direction (i.e., the height direction) of the two stepped surfaces. Although the invention is not necessarily limited in this manner, the top surface 20Ca$_1$ of the first step portion 20Ca may extend in a direction perpendicular to the extending direction (i.e., the height direction) of the two stepped surfaces. That is, the angle θ between the two stepped surfaces and the top surface 20Ca$_1$ of the first step portion 20Ca may be 90 degrees. According to some aspects, the angle θ between the two stepped surfaces and the top surface 20Ca$_1$ of the first step portion 20Ca may be between 30 degrees and 150 degrees, optionally between 50 and 130 degrees, and optionally between 70 and 110 degrees, based arrangement mode of the board.

As shown in FIGS. 5 and 6, a board 50C may be provided on the top surface 20Ca$_1$ of the first step portion 20Ca. Specifically, the board 50C may be provided in a stepped region formed by the first stepped surface 20Cb$_2$, the second stepped surface 20Cb$_2$', and the top surface 20Ca$_1$ of the first step portion 20Ca. When the board 50C is provided on the top surface 20Ca$_1$ of the first step portion 20Ca, the board 50C is received in the stepped region. In this way, it is possible to more efficiently reduce the size of the secondary mattery when the board 50C and the secondary battery 100C are integrated.

An external terminal 30C (i.e., a cathode external terminal 30Ca and an anode external terminal 30Cb) for a secondary battery may be provided on the surface of the exterior body 20C. For example, the external terminal 30C may be configured to be exposed to the first stepped surface 20Cb$_2$. However, the present invention is not necessarily limited to this configuration. For example, the external terminal 30C may be configured to be exposed on the second stepped surface 20Cb$_2$' or the top surface 20Ca$_1$ of the first step portion 20Ca. When the external terminal 30C is present in any of such positions, the external terminal 30C is arranged close to the board 50C, so that the length of the wiring connecting the external terminal 30C and the board 50C may be relatively short. As a result, power loss and space loss between the external terminal 30C and the board 50C can be suppressed, as compared with the case where the length of the wiring is relatively long. Furthermore, because the first stepped surface 20Cb$_2$ is continuous with the second stepped surface 20Cb$_2$' so as to extend in a different direction from the extending direction (i.e., the width direction) of the second stepped surface 20Cb$_2$', the first stepped surface 20Cb$_2$ and the second stepped surface 20Cb$_2$' may perform the function of the step surface, whereby the board 50C to be arranged can be more stably fixed.

Figure 7:
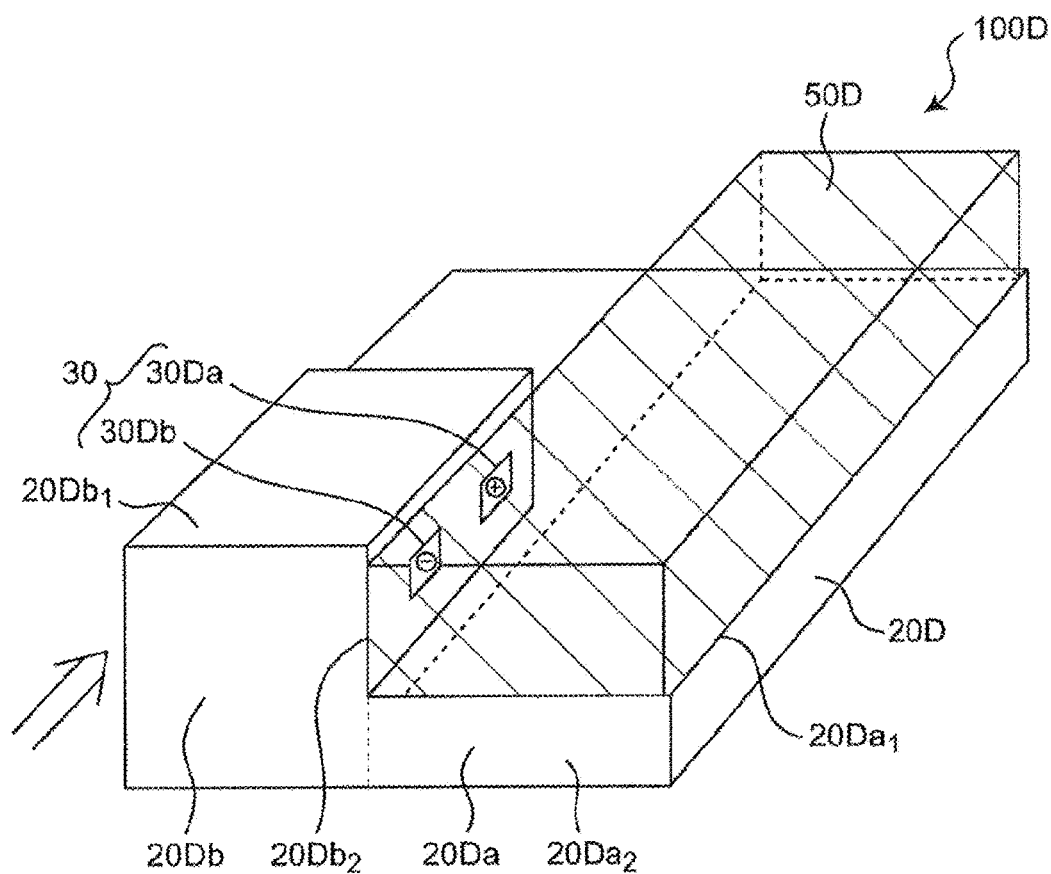
FIG. 7 is a perspective view schematically showing a secondary battery according to aspects of the present invention.
Figure 8:
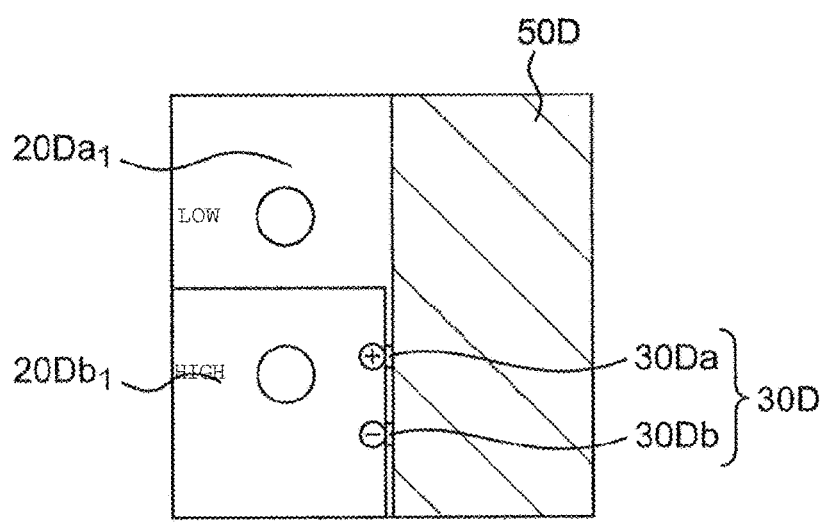
FIG. 8 is a plan view schematically showing a secondary battery according to aspects of the present invention.

FIG. 7 is another perspective view schematically showing a secondary battery according to the present invention. FIG. 8 is a plan view schematically showing a secondary battery according to the present invention.

As shown in FIG. 7, secondary battery 100D may have a structure in which an electrode assembly and an electrolyte are housed and sealed in an exterior body 20D.

The exterior body 20D may have at least two step portions. For example, the exterior body 20D may include a first step portion 20Da and a second step portion 20Db. The two step portions may be adjacent to each other and have mutually different heights of the top surfaces. Specifically, the first step portion 20Da and the second step portion 20Db may be adjacent to each other as viewed from the direction of the arrow (i.e., in side view) and the height of the top surface 20Db$_1$ of the second step portion 20Db may be larger than the height of the top surface $20Da_1$ of the first step portion 20Da. The top surface $20Db_1$ of the second step portion 20Db may be positioned only in the lower left region in a plan view. Because the height level of the top surface $20Da_1$ of the first step portion 20Da and the height level of the top surface $20Db_1$ of the second step portion 20Db are different from each other, the stepped surface $20Db_2$ is formed between the top surface $20Da_1$ of the first step portion 20Da and the top surface $20Db_1$ of the second step portion 20Db.

As shown in FIGS. 7 and 8, a board 50D may be provided on the top surface $20Da_1$ of the first step portion 20Da. That is, board 50D may be provided in a space region formed between the stepped surface $20Db_2$ and the top surface $20Da_1$ of the first step portion 20Da, i.e., corresponding to the stepped region described above. From the viewpoint of reducing the size of the secondary battery when integrating the board and the secondary battery, it may be preferable that the height of the board 50D be equal to or less than the height of the stepped surface $20Db_2$. When the board 50D is provided on the top surface $20Da_1$ of the first step portion 20Da, it is possible to effectively utilize the space region formed between the stepped surface $20Db_2$ and the top surface $20Da_1$ of the first step portion 20Da. In this way, it is possible to efficiently reduce the size of the secondary battery when the board 50D and the secondary battery 100D are integrated.

An external terminal 30D (i.e., a cathode external terminal 30Da and an anode external terminal 30Db) for a secondary battery may be provided on the surface of the exterior body 20D. For example, the external terminal 30D may be configured to be exposed to the stepped surface $20Db_2$. However, the present invention is not necessarily limited to this configuration. For example, the external terminal 30A may be configured to be exposed on the top surface $20Da_1$ of the first step portion 20Da and the end side surface $20Da_2$ of the first step portion 20Da. When the external terminal 30D is present in any of such positions, the external terminal 30D is arranged close to the board 50D, so that the length of the wiring connecting the external terminal 30D and the board 50D can be made relatively short. As a result, power loss and space loss between the external terminal 30D and the board 50D can be suppressed, as compared with the case where the length of the wiring is relatively long.

According to some aspects, the secondary battery may comprise an exterior body having at least two step portions, and in particular, having a low step portion and a high step portion adjacent to the low step portion, wherein the height of the top surface of the low step portion is smaller than the height of the top surface of the high step portion. Because the top surface of the low step portion and the top surface of the high step portion have different heights, a stepped surface is formed between the top surface of the low step portion and the top surface of the high step portion. In this way, the exterior body has a stepped structure formed between the stepped surface and the top surface of the low step portion.

In order to limit or prevent movement (e.g., shift) of an electrode assembly arranged in the exterior body having the stepped structure, it is preferable for the electrode assembly to have a stepped structure having substantially the same shape as the exterior body in a section view. In that regard, it should be understood that the following description of the electrode assembly is merely an example. It is presumed that the electrode assembly is provided inside the exterior body having two step portions.

The electrode assembly may include a positive electrode, a negative electrode, and a separator arranged between the positive electrode and the negative electrode, as described herein. According to some aspects, the electrode assembly may be of a first type, a second type, and/or a third type.

In the first type (i.e., a planar laminated structure type), the electrode assembly 10A may be formed by laminating a plurality of unitary electrode units including the positive electrode 1, 1A, the negative electrode 2, 2A, and the separator 3, 3A (see FIG. 13).

In the second type (i.e., the winding structure type), the electrode assembly 10B may be formed by winding an electrode unit including the positive electrode 1, 1B, the negative electrode 2, 2B, and the separator 3, 3B in a roll shape (see FIG. 14).

In the third type, the electrode assembly may have a so-called stack-and-fold structure formed by folding the electrode unit comprising a positive electrode, a negative electrode, and a separator, with a negative electrode. According to some aspects, in the third type, the electrode unit is laminated and extends in one direction.

Figure 9:
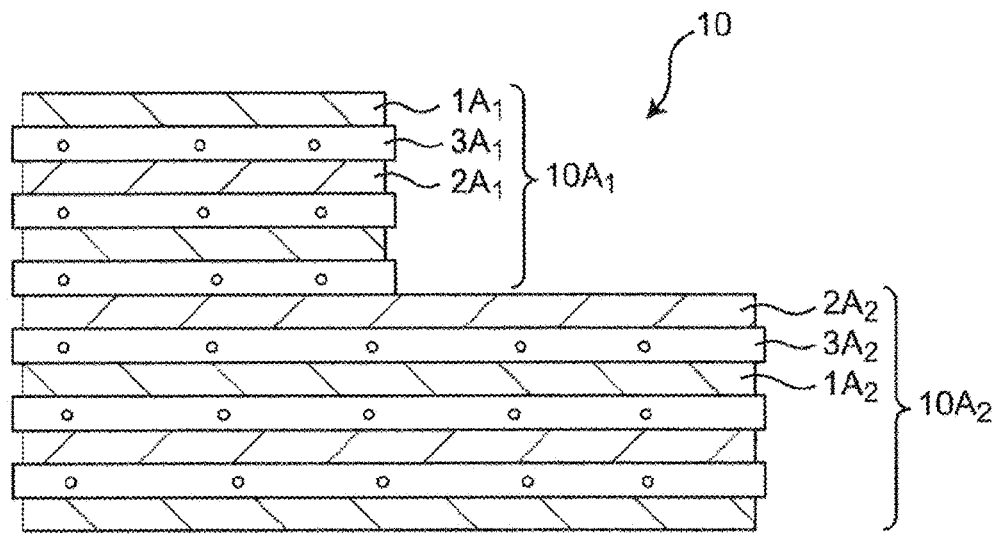
FIG. 9 is a cross-sectional view schematically showing an electrode assembly according to aspects of the present invention.

According to some aspects, the electrode assembly 10 may include at least two planar laminated structure sub-electrode assemblies (see FIG. 9). For example, the electrode assembly 10 may include a first planar laminated structure sub-electrode assembly $10A_1$ and a second planar laminated structure sub-electrode assembly $10A_2$. The first planar laminated structure sub-electrode assembly $10A_1$ may be formed by laminating a plurality of unitary electrode units including a positive electrode $1A_1$, a negative electrode $2A_1$, and a separator $3A_1$. Similarly, the second planar laminated structure sub-electrode assembly $10A_2$ may formed by laminating a plurality of unitary electrode units including a positive electrode $1A_2$, a negative electrode $2A_2$, and a separator $3A_2$.

In one example, in the electrode assembly 10, the second planar laminated structure sub-electrode assembly $10A_2$ may have a width dimension larger than the width dimension of the first planar laminated structure sub-electrode assembly $10A_1$ in a section view, as shown in FIG. 9, and may be in mutual contact with the first planar laminated structure sub-electrode assembly $10A_1$ so as to be located below the first planar laminated structure sub-electrode assembly $10A_1$. The electrode assembly 10 may have a stepped structure in a section view by having such a structure.

Below, an electrode assembly will be described on the premise that it has a stepped structure in a section view. The term "connection tab" as used herein refers to a portion corresponding to the uncoated portion of the electrode (i.e., the positive electrode and negative electrode) and a member not joined to the current collector lead. The term "connection portion" as used herein refers to a member configured to be connectable to each of the plurality of connection tabs. The term "lead tab" as used herein refers to a portion corresponding to the uncoated portion of the electrode (i.e., the positive electrode and negative electrode) and a member joined to the current collector lead. The term "lead portion" as used herein refers to a member configured to be connectable with each of the plurality of lead tabs.

Figure 10:
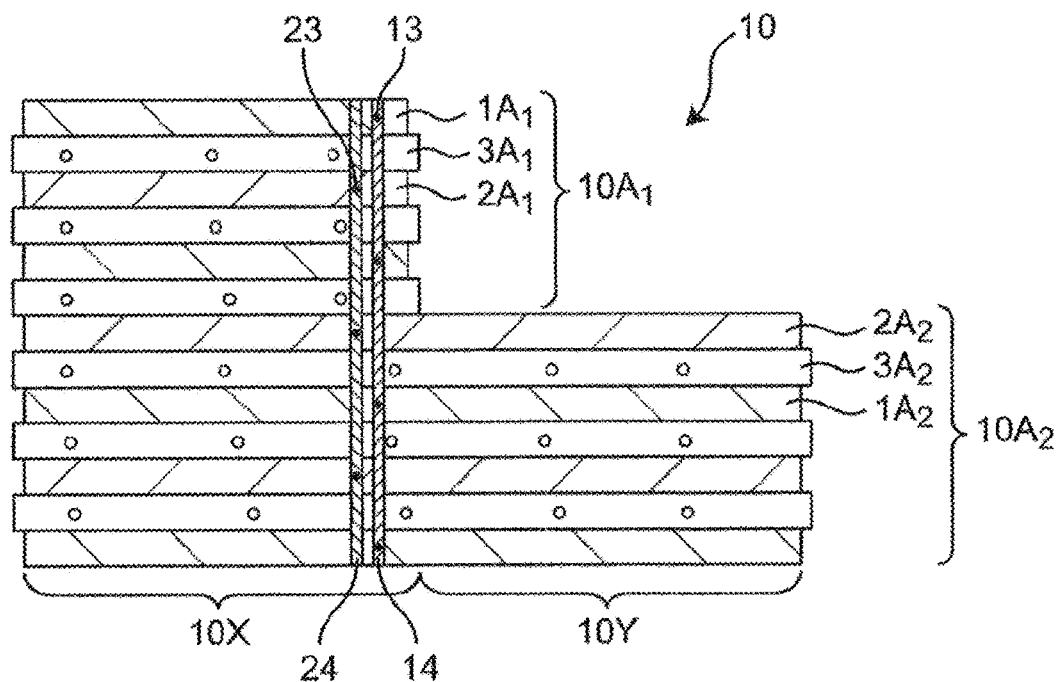
FIG. 10 is a cross-sectional view schematically showing a mode in which electrode tabs of an electrode assembly is connected only by a lead portion.

As shown in FIG. 10, the electrode assembly 10 having a stepped structure may have a first region 10X having a relatively high height in a section view, and a second region 10Y that is continuous with the first region 10X and has a relatively low height.

According to some aspects, the respective cathode lead tabs 13 included in each of the plurality of the positive electrodes comprised by the positive electrode $1A_1$ of the first planar laminated structure sub-electrode assembly $10A_1$ in the first region $10X$ and the positive electrode $1A_2$ of the second planar laminated structure sub-electrode assembly $10A_2$ in the first region $10X$ are connected to each other by a cathode lead portion 14, as shown in FIG. 10. For example, in order to connect each of a plurality of cathode lead tabs 13, the cathode lead portion 14 may be configured to extend in one direction substantially perpendicular to the extending direction of the cathode lead tabs 13. In another example, the cathode lead portion 14 may be configured to be connected to each of a plurality of cathode lead tabs 13 from a predetermined position.

Similarly, the respective anode lead tabs 23 included in each of the plurality of negative electrodes comprising the negative electrode $2A_1$ of the first planar laminated structure sub-electrode assembly $10A_1$ and the negative electrode $2A_2$ of the second planar laminated structure sub-electrode assembly $10A_2$ located in the first region $10X$ may be mutually connected by an anode lead portion 24, as shown in FIG. 10. In order to connect each of the plurality of anode lead tabs 23, the anode lead portion 24 may be configured to extend in one direction substantially perpendicular to the extending direction of the anode lead tabs 23. In another example, the anode lead portion 24 may be configured to be connected to each of a plurality of anode lead tabs 23 from a predetermined position.

According to some aspects, the cathode lead portion 14, mutually connecting all of the positive electrodes in the first region $10X$ may be configured to be electrically connected to the external terminal (for example, the external terminal 30Aa as shown in FIG. 1, the external terminal 30Ba as shown in FIG. 4, the external terminal 30Ca as shown in FIGS. 5 and 6, the external terminal 30Da as shown in FIGS. 7 and 8, etc.) via the cathode current collector lead.

Similarly, the anode lead portion 24 mutually connecting all of the positive electrodes in the first region $10X$ may be configured to be electrically connected to the external terminal (for example, the external terminal 30Ab as shown in FIG. 1, the external terminal 30Bb as shown in FIG. 4, the external terminal 30Cb as shown in FIGS. 5 and 6, the external terminal 30Db as shown in FIGS. 7 and 8, etc.) via the anode current collector lead.

According to some aspects, all of the positive electrodes may be mutually connected by the single cathode lead portion 14 so that it is possible to stabilize the electrical connection between the respective positive electrodes. Further, all of the negative electrodes may be mutually connected by the single anode lead portion 24 so that it is possible to stabilize the electrical connection between the respective negative electrodes. As described above, because it is possible to stably generate a cell reaction at all the electrodes, it is possible to stabilize the battery characteristics.

Figure 11:
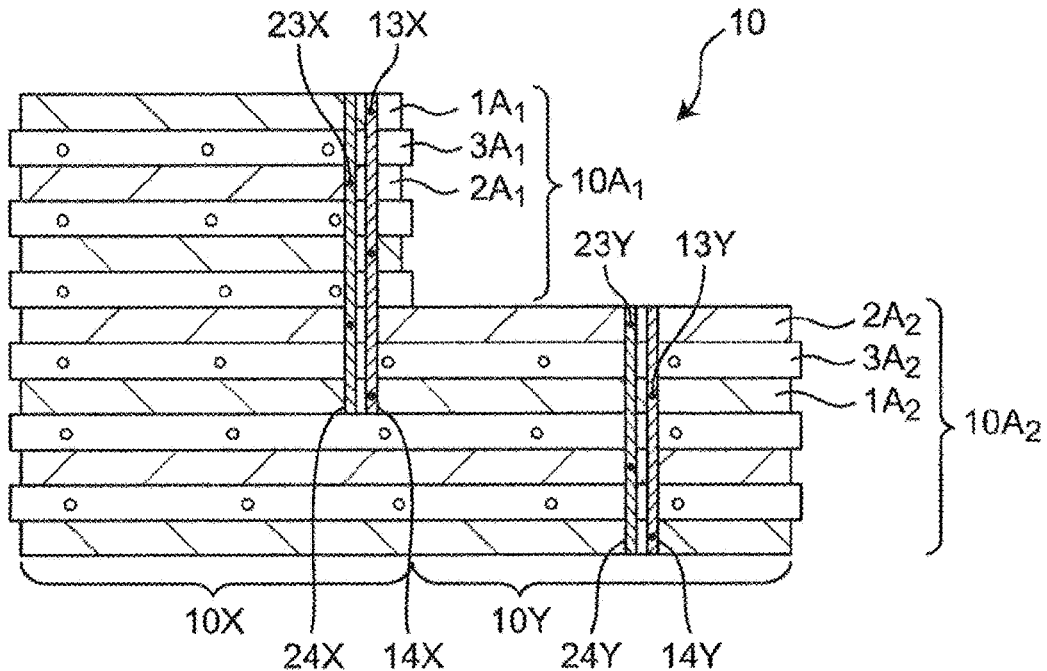
FIG. 11 is a cross-sectional view schematically showing a mode in which an electrode tab of an electrode assembly is connected by a combination of a lead portion and a connection portion.

It should be understood that the invention is not necessarily limited to the above configuration. For example, the respective cathode lead tabs 13X included as part of the positive electrodes of the plurality of positive electrodes (the plurality of positive electrodes comprising the positive electrode $1A_1$ of the first planar laminated structure sub-electrode assembly $10A_1$ in the first region $10X$ and the positive electrode $1A_2$ of the second planar laminated structure sub-electrode assembly $10A_2$ in the first region $10X$) may be connected with each other by a cathode lead portion 14X, as shown in FIG. 11. In order to connect part of a plurality of cathode lead tabs 13X, the cathode lead portion 14X may be configured to extend in one direction substantially perpendicular to the extending direction of the cathode lead tabs 13X. In another example, the cathode lead portion 14X may be configured to be connected to part of the plurality of cathode lead tabs 13X from a predetermined position.

Similarly, the respective anode lead tabs 23X included as part of the plurality of negative electrodes (the plurality of negative electrodes comprising the negative electrode $2A_1$ of the first planar laminated structure sub-electrode assembly $10A_1$ and the negative electrode $2A_2$ of the second planar laminated structure sub-electrode assembly $10A_2$ located in the first region $10X$) may be mutually connected by an anode lead portion 24X, as shown in FIG. 11. According to some aspects, in order to connect part of a plurality of anode lead tabs 23X, the anode lead portion 24X may be configured to extend in one direction substantially perpendicular to the extending direction of the anode lead tabs 23X. In another example, the second anode lead portion 24X may be configured to be connected to part of the plurality of anode lead tabs 23X from a predetermined position.

According to some aspects, the cathode lead portion 14X may be configured to be electrically connected to the external terminal (for example, the external terminal 30Aa in FIG. 1, the external terminal 30Ba in FIG. 4, the external terminal 30Ca in FIGS. 5 and 6, the external terminal 30Da in FIGS. 7 and 8, etc.) via the cathode current collector lead.

Similarly, the anode lead portion 24X may be configured to be electrically connected to the external terminal (for example, the external terminal 30Ab in FIG. 1, the external terminal 30Bb in FIG. 4, the external terminal 30Cb in FIGS. 5 and 6, the external terminal 30Db in FIGS. 7 and 8, etc.) via the anode current collector lead.

Alternatively, as shown in FIG. 11, the positive electrode in the second region $10Y$, more specifically, respective cathode connection tabs 13Y of the positive electrode $1A_2$ of the second planar laminated structure sub-electrode assembly $10A_2$, may be mutually connected by a cathode connection portion 14Y.

For example, in order to connect the respective cathode connection tabs 13Y, the cathode connection portion 14Y may be configured to extend in one direction substantially perpendicular to the extending direction of the cathode connection tabs 13Y. In another example, the cathode connection portion 14Y may be configured to be connected to the respective cathode connection tabs 13Y from a predetermined position.

Similarly, the negative electrode in the second region $10Y$, more specifically, respective anode connection tabs 23Y of the negative electrode $2A_2$ of the second planar laminated structure sub-electrode assembly $10A_2$, may be mutually connected by an anode connection portion 24Y.

According to some aspects, in order to connect the respective anode connection tabs 24Y, the anode connection portion 24Y may be configured to extend in one direction substantially perpendicular to the extending direction of the anode connection tabs 23Y. In another example, the anode connection portion 24Y may configured to be connected to the respective anode connection tabs 23Y from a predetermined position.

As shown in FIG. 11, from the viewpoint of enabling the electrode assembly 10 to be electrically connected as a whole, it may be necessary for at least one positive electrode $1A_2$ located in the second region $10Y$ to be configured to be electrically connected mutually to at least one positive electrode $1A_1$ located in the first region $10X$. In particular, it may be necessary for at least one positive electrode to have both the cathode lead tab 13X and the cathode connection tab 13Y in a plan view. Similarly, as shown in FIG. 11, it may be necessary for at least one negative electrode $2A_2$ located in the second region 10Y to be configured to be electrically connected mutually to at least one negative electrode 2A$_1$ located in the first region 10X. In particular, it may be necessary for at least one negative electrode to have both the anode lead tab 23X and the anode connection tab 23Y in a plan view.

As described above, the cathode lead portion configured to be electrically connected to the external terminal and the cathode connection portion provided to ensure electrical conduction between the respective positive electrodes may be provided. Similarly, as described above, the anode lead portion configured to be electrically connected to the external terminal and the anode connection portion provided to ensure electrical conduction between the respective negative electrodes may be provided. According to some aspects, the lead portion and the connection portion may be provided, and the respective positive electrodes and the respective negative electrodes may be electrically connected as a whole. Therefore, when the lead portion is installed at any position, it is possible to increase the degree of freedom of installation of the external terminal electrically connected to the lead portion.

As shown in FIG. 11, it may be preferable for the cathode lead portion 14X and the anode lead portion 24X, and the cathode connection portion 14Y and the anode connection portion 24Y, to be arranged on only one side in the exterior body. In this way, it may be possible to relatively reduce the width dimension of the electrode assembly 10 in a plan view due to the absence of the anode lead portion 24X and the anode connection portion 24Y on the other side of the electrode assembly 10, as compared with the case where the cathode lead portion 14X and the cathode connection portion 14Y are arranged on one side of the electrode assembly 10, and the anode lead portion 24X and the anode connection portion 24Y are arranged on the other side of the assembly. It may thus be possible to relatively reduce the size of the exterior body housing the electrode assembly 10 therein due to the relative reduction of the width dimension of the electrode assembly 10. That is, the size of the secondary battery of the present invention may be relatively small.

Figure 12:
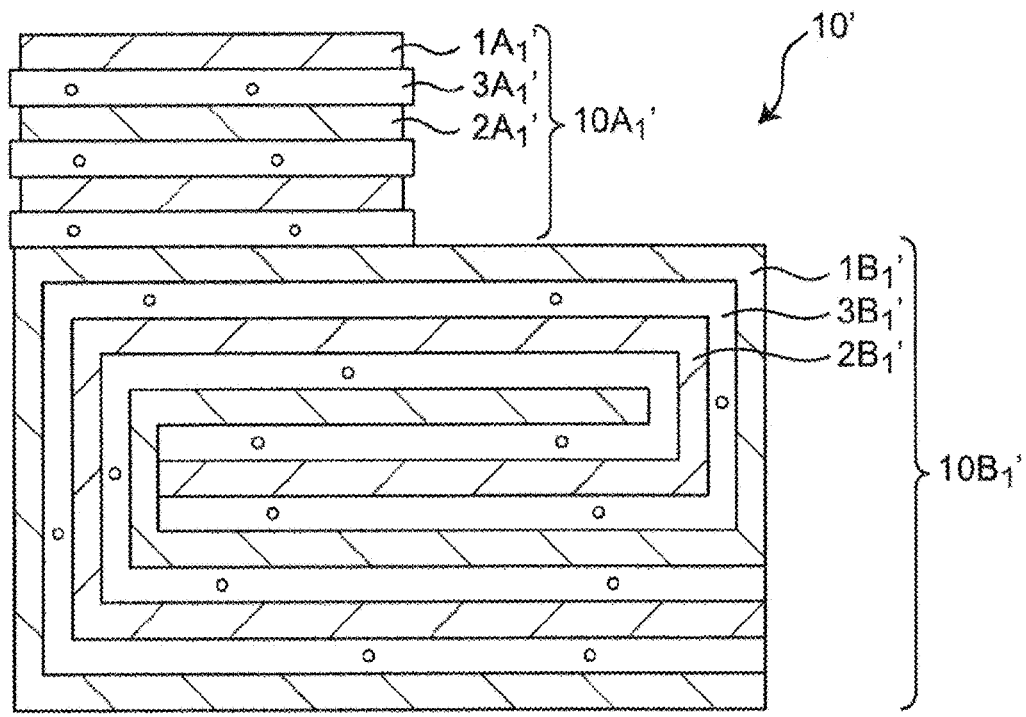
FIG. 12 is a cross-sectional view schematically showing an electrode assembly according to aspects of the present invention.

According to some aspects, electrode assembly 10' may include at least a planar laminated structure sub-electrode assembly and a winding structure sub-electrode assembly (see FIG. 12). The planar laminated structure sub-electrode assembly 10A$_1$' may be formed by laminating a plurality of unitary electrode units including a positive electrode 1A$_1$', a negative electrode 2A$_1$', and a separator 3A$_1$'. The winding structure sub-electrode assembly 10B$_1$' may be formed by winding an electrode unit including a positive electrode 1B$_1$', a negative electrode 2B$_1$', and a separator 3B$_1$' in a roll shape. According to some aspects, the winding structure sub-electrode assembly 10B$_1$ may have a width dimension larger than the width dimension of the planar laminated structure sub-electrode assembly 10A$_1$ in a section view as shown in FIG. 12, and may be in mutual contact with the planar laminated structure sub-electrode assembly 10A$_1$ so as to be located below the planar laminated structure sub-electrode assembly 10A$_1$.

In another example, the planar laminated structure sub-electrode assembly may have a width dimension larger than the width dimension of the winding structure sub-electrode assembly in a section view, and may be in mutual contact with the winding structure sub-electrode assembly so as to be located below the winding structure sub-electrode assembly.

In another example, the electrode assembly may include at least two winding structure sub-electrode assemblies (not shown). For example, the electrode assembly may include a first winding structure sub-electrode assembly and a second winding structure sub-electrode assembly. Both of the first winding structure sub-electrode assembly and the second winding structure sub-electrode assembly may be formed by winding an electrode unit including a positive electrode, a negative electrode, and a separator in a roll shape. In this case, for example, the second winding structure sub-electrode assembly may have a width dimension that is larger than the width dimension of the first winding structure sub-electrode assembly in a section view, and may be in mutual contact with the first winding structure sub-electrode assembly so as to be located below the first winding structure sub-electrode assembly.

A detailed description of FIG. 9 may be redundant and unnecessary, but it should be understood that whether the electrode assembly includes at least a planar laminated structure sub-electrode assembly and a winding structure sub-electrode assembly (see FIG. 12) or the electrode assembly includes at least two winding structure sub-electrode assemblies (not shown), a pattern using only a lead portion connecting lead tabs of each electrode may be applied, or from the viewpoint of improving the degree of freedom of installation of the external terminal, a pattern using both the lead portion and the connection portion may be applied.

The secondary battery according to the present invention can be used in various fields in which electricity storage is required. Although it is merely an example, the secondary battery according to the present invention, particularly the nonaqueous electrolyte secondary battery, may be used for electricity/information/communication fields where mobile devices are used (for example, fields of mobile devices such as mobile phones, smart phones, laptop computers and digital cameras, activity meters, arm computers, electronic paper etc.), household/small industrial applications (for example, fields of electric power tools, golf carts, household/nursing-care/industrial robots, etc.), large industrial applications (for example, fields of forklifts, elevators, harbor port cranes, etc.), transportation system fields (for example, fields of hybrid cars, electric vehicles, buses, trains, electric assisted bicycles, electric motorcycles, etc.) power system applications (for example, fields of various power generations, load conditioners, smart grids, household installation storage systems, etc.), IoT fields, space/deep sea applications (for example, fields of space probes, submersible ships, etc.), and combinations thereof.

DESCRIPTION OF REFERENCE SYMBOLS 100A, 100B: secondary battery
1, 1A, 1B: positive electrode
2, 2A, 2B: negative electrode
3, 3A, 3B: separator
10, 10A, 10B: electrode assembly
first planar laminated structure sub-electrode assembly
10A$_2$: second planar laminated structure sub-electrode assembly
10A$_1$': planar laminated structure sub-electrode assembly
10B$_1$': winding structure sub-electrode assembly
20A, 20B, 20C, 20D: exterior body
20Aa: first step portion
20Aa$_1$: top surface of first step portion
20Aa$_2$: end side surface of first step portion
20Ab: second step portion
20Ab$_1$: top surface of second step portion 20Ab$_2$: stepped surface
20Ba: first step portion
20Ba$_1$: top surface of first step portion
20Ba$_2$: first stepped surface
20Bb: second step portion
20Bb$_1$: top surface of second step portion
20Bc: third step portion
20Bc$_1$: top surface of third step portion
20Bc$_2$: second stepped surface
20Ca: first step portion
20Ca$_1$: top surface of first step portion
20Cb: second step portion
20Cb$_1$: top surface of second step portion
20Cb$_2$: first stepped surface
20Cb$_2$': second stepped surface
20Da: first step portion
20Da$_1$: top surface of first step portion
20Da$_2$: end side surface of first step portion
20Db: second step portion
20Db$_1$: top surface of second step portion
20Db$_2$: stepped surface
30A, 30B, 30C, 30D: external terminal
50A, 50A', 50A'', 50B, 50C, 50D: board

The invention claimed is:

1. A secondary battery comprising:
an electrode assembly, wherein the electrode assembly comprises:
   a first sub-electrode assembly comprising a first positive electrode, a first negative electrode, and a first separator between the first positive electrode and the first negative electrode, and
   a second sub-electrode assembly comprising a second positive electrode, a second negative electrode, and a second separator between the second positive electrode and the second negative electrode,
wherein the electrode assembly has a stacking direction where the first positive electrode, the first negative electrode and the first separator are alternately arranged;
an electrolyte; and
an exterior body housing the electrode assembly and the electrolyte,
wherein the exterior body comprises at least a low step portion adjacent to a high step portion, the low step portion having a first height and the high step portion having a second height, the first height being less than the second height,
wherein the exterior body also comprises a first stepped surface between a top surface of the low step portion and a top surface of the high step portion, and the top surface of the low step portion extends along a plane transverse to the stacking direction of the electrode assembly,
wherein the first sub-electrode assembly is continuous with the second sub-electrode assembly,
wherein at least a first portion of the first positive electrode and at least a first portion of the first negative electrode are provided within the high step portion of the exterior body,
wherein at least a first portion of the second positive electrode and at least a first portion of the second negative electrode are provided within the low step portion of the exterior body,
wherein the first portion of the first positive electrode is electrically connected mutually to the first portion of the second positive electrode via a plurality of cathode lead tabs and a cathode lead portion, wherein the plurality of cathode lead tabs extend in a direction that is substantially perpendicular to an extending direction of the cathode lead portion, and/or the first portion of the first negative electrode is electrically connected mutually to the first portion of the second negative electrode via a plurality of anode lead tabs and an anode lead portion, wherein the plurality of anode lead tabs extend in a direction that is substantially perpendicular to an extending direction of the anode lead portion, and
wherein the secondary battery further comprises an external terminal, the external terminal comprising an exposed portion of the first stepped surface, an exposed portion of the top surface of the low step portion, or a combination thereof.

2. The secondary battery according to claim 1, further comprising a board on the top surface of the low step portion.

3. The secondary battery according to claim 2, wherein at least a portion of the board is proximal to the first stepped surface.

4. The secondary battery according to claim 3, wherein the portion of the board has a height dimension that is smaller than a height dimension of the first stepped surface.

5. The secondary battery according to claim 3, wherein the portion of the board has a width dimension that is smaller than a width dimension of the top surface of the low step portion.

6. The secondary battery according to claim 2,
wherein the external terminal is configured to be electrically connectable to the board via wiring.

7. The secondary battery according to claim 6, wherein the external terminal further comprises an exposed portion of a side surface of the low step portion.

8. The secondary battery according to claim 2, wherein the board is a rigid board, a flexible board, or a protective circuit board.

9. The secondary battery according to claim 1, wherein the first stepped surface forms a side surface of the high step portion.

10. The secondary battery according to claim 1, wherein the top surface of the low step portion is continuous with the first stepped surface so as to extend in a direction that is different from an extending direction of the first stepped surface.

11. The secondary battery according to claim 1, wherein the first stepped surface is adjacent to one side of the low step portion.

12. The secondary battery according to claim 1 further comprising a second high step portion, the second high step portion being adjacent to the low step portion and having a third height,
   wherein the first height is less than the third height, and
   wherein at least a second stepped surface is formed between the top surface of the low step portion and a top surface of the second high step portion.

13. The secondary battery according to claim 12,
   wherein the second stepped surface extends in a direction that is different from an extending direction of the top surface of the second high step portion, and
   wherein the second stepped surface and the top surface of the second high step portion are continuously formed.

14. The secondary battery according to claim 1, wherein the first sub-electrode assembly and the second sub-electrode assembly have different width dimensions in a section view.

15. The secondary battery according to claim 1, wherein the first sub-electrode assembly has a planar laminated structure such that the first positive electrode, the first negative electrode, and the first separator are laminated in a planar shape.

16. The secondary battery according to claim 15, wherein the second sub-electrode assembly has a winding structure such that the second positive electrode, the second negative electrode, and the second separator are wound in a roll shape.

17. The secondary battery according to claim 1, wherein the first sub-electrode assembly has a winding structure such that the first positive electrode, the first negative electrode, and the first separator are wound in a roll shape.

18. The secondary battery according to claim 1, wherein the positive electrode and the negative electrode have a layer capable of storing and releasing lithium ions.

19. A device comprising:
the secondary battery according to claim 1; and
a board,
wherein at least part of the board is arranged on the top surface of the low step portion.

20. The device according to claim 19, wherein the device is a mobile device.

\* \* \* \* \*